Figure 1:
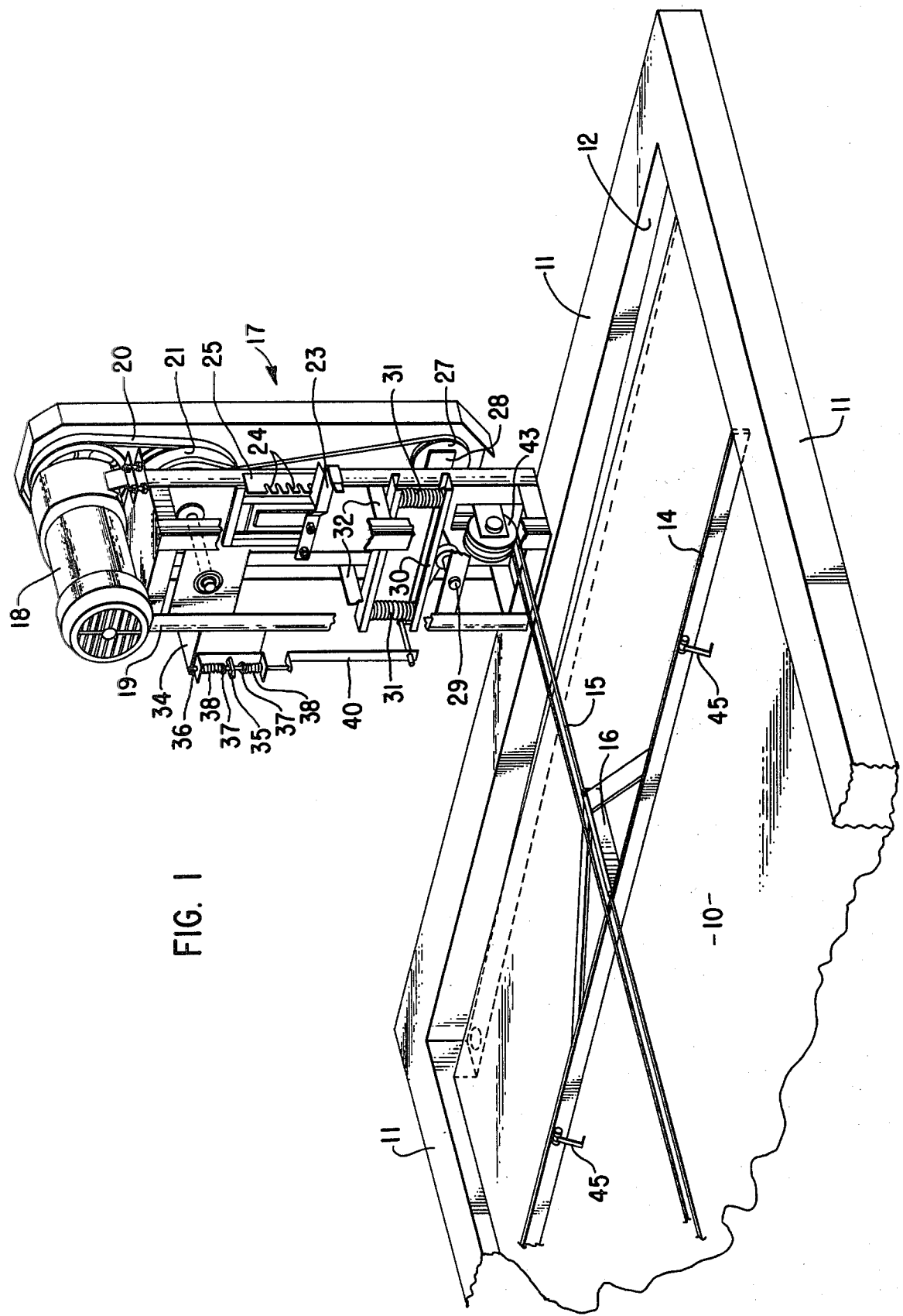

United States Patent [19]

Diedrich

[11] 4,354,593
[45] Oct. 19, 1982

[54] MECHANISM FOR CLEANING SUBFLOOR OF LIVESTOCK CONFINEMENT UNIT

[76] Inventor: Orville J. Diedrich, Iona, Minn. 56141

[21] Appl. No.: 244,973

[22] Filed: Mar. 18, 1981

[51] Int. Cl.³ .............................................. B65G 25/04
[52] U.S. Cl. .................................. 198/718; 15/93 R; 198/748
[58] Field of Search ............. 15/93 R, 93 B; 198/747, 198/718, 748, 856, 857; 119/22

[56] References Cited

U.S. PATENT DOCUMENTS 3,860,109  1/1975  Benzmiller ........................ 198/748
4,243,137  1/1981  Laurenz ............................ 198/748

*Primary Examiner*—Edward L. Roberts

[57] ABSTRACT

A mechanism for cleaning floors of animal waste including a scraper adapted to be pulled across the floor by cables having a drive mechanism with novel safety and reversing controls. The blade also uses novel pivoted legs to raise the scraper off the floor while it is returned to its starting point.

9 Claims, 6 Drawing Figures

MECHANISM FOR CLEANING SUBFLOOR OF LIVESTOCK CONFINEMENT UNIT

BACKGROUND AND SUMMARY OF THE INVENTION

This invention pertains to livestock confinement structures and more particularly to a device for sweeping livestock wastes from the floor—usually a subfloor under a slat or mesh upper surface—into a waste pit or gutter from which the manure can be flushed or will run into a waste pit.

Modern livestock raisers are now customarily using confinement units for the feeding of this product. These units are adapted to confine the livestock in pens with restricted space, better control of environment—particularly cleanliness and temperature of the surroundings—and automated feeding and waste disposal systems.

Waste disposal is a particular problem because of sanitation requirements both within the unit itself and as to the ultimate disposal of the waste material. The development of the slat floor or mesh floor on which the animals are supported, but through which most of the waste material falls has eased the problem of accumulation of the material. It now can be swept from the subfloor to a gutter or the like either at one edge of the floor or running through the center of a longer floor. From the gutter the manure can be flushed or will naturally run to one end and into some sort of disposal unit. This latter unit may be a pit from which the material is pumped to be spread over farm fields as an organic fertilizer or may be a treatment lagoon or the like.

Regardless of the type of disposal, the manure must be moved from the subfloor to the gutter. The usual device for accomplishing that movement is some sort of scraper. Typically, the confinement unit is a long, narrow structure having a central, longitudinal alley raised somewhat above a series of pens. The pens are arranged on opposite sides of the alley along the outer walls of the structure. A single subfloor extends under each row of pens. Thus each set of pens has a relatively long shallow trough-like subfloor running longitudinally of the group of pens. There may be gutters to receive the manure at one end of the subfloor or at both ends or in the middle. A scraper extends transversely of the trough formed by each subfloor and is pulled longitudinally of that trough to scrape the manure toward the gutter.

Problems are frequently encountered in such a system in providing adequate safety stops at the ends of the runs of the scraper. The material being moved tends to rust materials quite rapidly and affects copper as well as iron materials. This inhibits the use of simple limit switches engaged by the scraper as it nears the end of its run. The switch, being so close to the corrosive material has a very short useful life and the device becomes impractical. Therefore, some other system is highly desirable.

Another problem concerns itself with returning the scraper blade to the end of the trough after it has completed its run. If gutters are provided at both ends of the trough, this may not be a problem. But widely spaced gutters are not conducive to compact collecting means and require long pipes or gutters to deliver the material to the central collection pit. Thus, it is desirable to use only a single gutter for each trough-like subfloor and thus to scrape the material in only one direction. However, such construction requires that the scraper be returned to its original starting position without scraping a lot of material in the reverse direction.

By my invention I provide solutions to both problems in unique ways. In order to provide adequate and well protected stop means for my power unit, I use the tensions in the cable to tilt an arm which in turn trips a switch so that excess tension will promptly stop the operation of the device. I also provide unique self-actuating running devices adapted to raise the scraper above the floor on its return run to the starting position so that the scraper is raised enough that it does not scrape material away from the gutter end of the floor.

FIGURES

Figure 2:
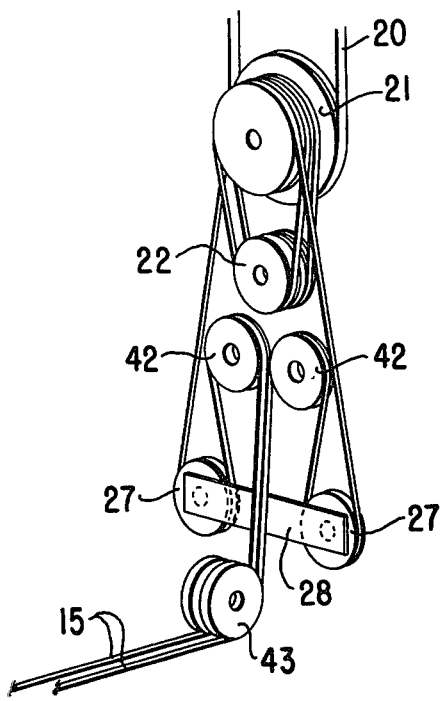
Figure 3:
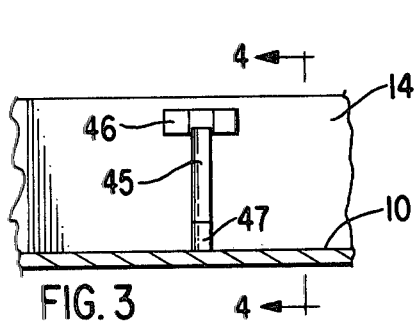
Figure 4:
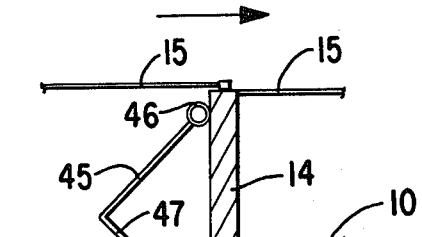
Figure 5:
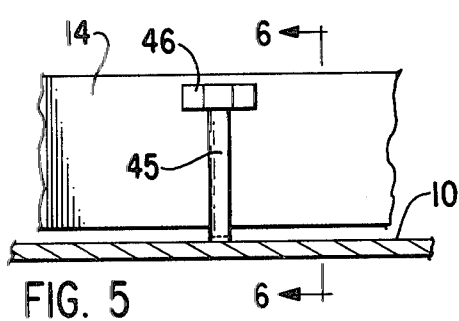
Figure 6:
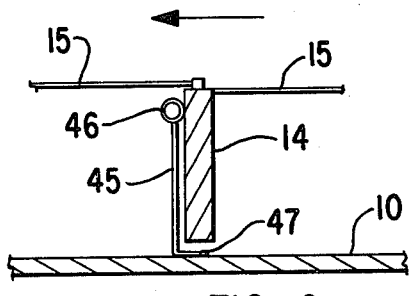

FIG. 1 is a pictorial view of my unit having a vertically mounted power unit and showing the scraper in place, FIG. 2 is a view of the drive mechanism isolated from the unit and indicating the path taken by the pulling cable, FIG. 3 is a detailed partial elevational view of a portion of the scraper blade to an enlarged scale to show the runner means retracted to allow the blade to scrape the floor, FIG. 4 is a sectional view from line 4—4 of FIG. 3, FIG. 5 is a view similar to FIG. 3 with the runner means in place to raise the scraper blade, and FIG. 6 is a sectional view from line 6—6 of FIG. 5.

DESCRIPTION

Briefly my invention comprises a device for cleaning the floors of a typical confinement unit for the raising of livestock. The invention resides principally in a novel control system for stopping the scraper at the end of its run and in a means for providing a return movement of the scraper without substantially moving animal waste on the return.

More specifically and referring to the figures, the device is designed for use on a floor 10 having raised edges or curbs 11. A slat floor or expanded metal floor (not shown) is adapted to rest on the curbs above the floor 10. The animals being raised in the unit walk and rest on the slat floor, but droppings of animal waste fall through the openings between the slats or through openings in the expanded metal and onto the floor 10 from which the material must be removed. Removal is accomplished by scraping the material into a gutter 12 from which the manure is flushed or runs into a disposal or retaining system.

The scraping of the material is done by a scraper blade 14 fastened to a cable 15. In order to keep the blade 14 nearly perpendicular to the side curbs 11, I provide a tongue 16 also attached to the cable 15.

The cable 15 is a continuous cable running through a drive means indicated generally at 17 in FIG. 1 and including several pulleys as detailed in FIG. 2. At the end of the floor, not shown in the figures, the cable 15 simply is routed around a single pulley in a manner well known.

The drive mechanism is powered by a motor 18 mounted on a frame 19. The motor drives a belt 20 entrained over a driving pulley 21. In order to achieve adequate pulling traction between the cable 15 and the driving pulley, I prefer to use a two or three grooved pulley with an idler pulley 22. This idler may be mounted on a lever 23 (FIG. 1) which is adjustable to a plurality of positions defined by notches 24 in an adjacent plate 25. Thus, if the cable 15 should become stretched for any reason, or if it becomes slack for any reason, the slack can be taken up by adjusting the position of the idler pulley 22 and thus the distance between the idler 22 and the drive pulley 21.

My limiting mechanism relies on a tilting arm device controlling by tension in the cables in one or the other sides of the scraper blade 14. For that purpose I provide a pair of rocking pulleys 27 mounted on a rocking beam 28. The beam 28 is pivotally mounted on an axle 29 journalled in a part of the frame 19. Also fixed to the axle 29, to rock in concert with it, is a spring-loaded arm 30 which is biassed to a normal or level position by a pair of springs 31 attached between the arm 30 and extensions 32 of the frame.

The limit switch mechanism is operated by tilting of this beam and arm assembly. As illustrated best in FIG. 1, the switch mechanism 34 is mounted on the side of the frame 19. An operating lever 35 extends outwardly from the switch. The switch is of the type having a central "off" position and opposite reversing positions to either side of the "off". Thus the lever 35 has three possible positions. Immediately adjacent the lever 35 is a sliding bar 36 on which are mounted a pair of stops 37—one on either side of the lever 35. These are illustrated as nuts on a threaded bar, but may be any sort of means adapted to engage and throw the switch lever 35. The stops should be spaced somewhat from the lever so that minor movements of the bar 36 will not trip the switch and also to provide for manual setting of the switch as will be described. Springs 38 may be provided to hold the bar in its central or neutral position.

Movement of the bar 36 is controlled by the arm 30 through a linkage 40 attached between one end of the arm 30 and the lower end of the sliding bar 36. Thus, as the arm 30 tilts against the force of the springs 31, the bar 36 will slide to a point where one of the stops 37 engages the switch lever 35. Further motion will then move the switch lever from the position in which it was set to another position as will be further explained.

In order that tension in the cable will effect movement of the beam 28, it is desirable to use the mechanical advantage of the pulleys. Thus, I provide a pair of idler pulleys 42 located so that this cable runs around the pulleys 27 and returns to a parallel position with itself. The result is that both sides of the cable are pulling the pulley 27 in the same direction. If necessary, direction changing pulleys 43 may be used to provide that the main run of the cable to the scraper is properly aligned.

In operation, the switch lever 35 is manually set to either an "up" or a "down" position. Each of these positions is an "on" position and will operate the motor 18. Each is simply the opposite of the other to operate the motor in reverse directions. In the position chosen, the motor will operate the pulley system to pull the scraper in one direction. As it is pulled, the scraper may engage minor blockages, which may cause some rocking of the arm 30, but because of the spacing of the stops 37 on the bar 36, no movement of the switch lever 35 will result. However, upon engaging a major blockage or—more likely—the wall at the end of the run for the scraper, the tension in one side of the cable will build to the point where the arm 30 will be rocked sufficient to trip the switch to its center or "off" position. The motor will then stop, and the tension in the cable will be eased. At this point the operator may manually reverse the switch to cause the scraper to return to its original position, or may simply ignore the device until a convenient time to reverse the system.

Because it is likely that the operator may leave the device for some time after it is actuated to clean the floor, it is possible that there may be some added material dropped onto the floor 10 before the scraper 14 is returned to its original position after a cleaning. Considerable saving can be achieved by having gutters at only one end of the floor, so it is generally desirable that material not be scraped by the scraper 14 on its return run. Therefore, I provide a novel mechanism to raise the scraper 14 above the floor 10 on the return of the scraper to the end of the floor remote from the gutter 12. This mechanism includes a pair of L-shaped levers 45 pivotally attached to the scraper blade 14 by hinges 46. As illustrated in FIGS. 5 and 6, the levers are slightly longer than the distance from the hinge 46 to the lower edge of the scraper 14. Thus, when the toe 47 of the lever is flat on the surface of the floor 10, the scraper blade 14 is raised off the floor.

The operation of this device can best be seen by comparing FIG. 4 and FIG. 6. In FIG. 4 the device is illustrated with the blade 14 in its scraping position. In this mode, the movement is to the right in the figure as designated by the arrow. The lever 45 is simply dragging along behind the blade 14 with one edge of the toe 47 scraping along on the floor 10. As the direction of movement is reversed, the situation changes to the position illustrated in FIG. 6. The toe 47 catches by friction or because of the roughness of the floor 10 so that the lever 45 pivots to a position against the back of the blade 14. Because of the length of the lever 45, this necessarily results in the raising of the blade 14 above the floor 10 and the assembly skids back to its original position with the blade being carried above the material lying on the floor as desired. Thus, I have provided a means for cleaning the subfloor under a slat floor or expanded metal floor with only minimal attention and with considerable economy. Further, all controls are completely removed from the waste material being moved so that corrosion may be kept to a minimum.

I claim:

1. For use in moving waste material from a subfloor having curbed edges to a gutter at one end of said subfloor, a mechanism including a scraper blade adapted to extend laterally across said subfloor between said edges, cable means attached to said blade and extending longitudinally of said subfloor in opposite directions from said blade, pulley means engaging said cable means at both ends of said subfloor to direct said cable means, drive means engaging said cable means in pulling relationship, said drive means being reversible so that said cable means may be pulled in opposite directions, control means connected to said drive means adapted to control said drive means, said control means having a central position and two opposite positions, said opposite positions providing for pulling said cable means in opposite directions and said central position providing a neutral position in which said drive means does not pull, and operating means operably connected to said control means and in engagement with said cable means, said operating means including rocking arm means operably connected to said control means, pulleys rotatably mounted near opposite ends of said rocking arm means, said cable means being entrained over said pulleys such that the cable on one of said pulleys pulls said scraper blade in one direction and the cable over the opposite pulley pulls said blade in the opposite direction whereby extra tension on one pulley relaxes the tension in the opposite pulley thereby causing movement of said rocking arm means to move said control means to the neutral position.

2. The device of claim 1 in which said operating means also includes a linkage between said arm means and said control means to provide the connection therebetween, said linkage being loosely connected to said control means so that minor movements of said arm means do not change the position of said control means.

3. The device of claim 1 in which said cable means runs from said drive means over the pulleys on said arm means and thence is doubled back to run over idler pulleys located in a direction toward said drive means from said pulleys on said arm means whereby a mechanical advantage of two is provided on said arm means by tension in said cable means.

4. The device of claim 1 in which said arm means is biassed to a neutral position by spring means engaged with said arm means.

5. The device of claim 1 in which said drive means includes a multiple grooved pulley engaged with said cable means, an idler pulley adapted to receive said cable means from multiple grooved pulley so that said cable means is driven by engagement with all of the grooves in said multiple grooved pulley.

6. The device of claim 5 in which said idler pulley is mounted on movable means whereby the tension in said cable means between said idler pulley and said multiple grooved pulley may be released.

7. The device of claim 6 in which said movable means has more than two positions whereby the tension in said cable means between said multiple grooved pulley and said idler pulley may be adjustably varied.

8. The device of claim 1 in which said blade means has a forward or scraping side and a reverse side, at least two lever means pivotally attached to said reverse side on a longitudinal hinge line, said lever means being longer than the distance from the hinge line to the edge of said scraper means nearest said subfloor, said lever means being freely movable so that they trail behind said scraper means when said scraper means moves toward said forward side but rock toward said scraper means when moved in the opposite direction to lift said scraper means above said subfloor.

9. The device of claim 8 in which said lever means are L-shaped, the toe of said L-shape being adapted to slide under said scraper means when said scraper means is lifted.

* * * * *